United States Patent [19]
DeLuca et al.

[11] Patent Number: 4,872,005
[45] Date of Patent: Oct. 3, 1989

[54] PAGING RECEIVER CAPABLE OF REMINDING A USER OF AN IMPORTANT MESSAGE EVENT

[75] Inventors: Joan S. DeLuca, Boca Raton; Thomas F. Holmes, Boynton Beach; Mark J. Abbaticchio, Plantation, all of Fla.

[73] Assignee: Motorola, Inc., Schaumburg, Ill.

[21] Appl. No.: 140,364

[22] Filed: Jan. 4, 1988

[51] Int. Cl.[4] ........................ H04Q 7/00; G04B 47/00

[52] U.S. Cl. ............................... 340/825.440; 368/10; 368/109; 340/825.460

[58] Field of Search ...................... 340/825.44, 825.46, 340/825.55, 309.1, 309.15; 368/109, 107, 108, 10, 28, 41

[56] References Cited

U.S. PATENT DOCUMENTS

| | | |
|---|---|---|
| 3,745,761 | 7/1973 | Tsuruishi . |
| 3,813,533 | 5/1974 | Cone et al. . |
| 3,822,547 | 7/1974 | Fujita . |
| 3,834,153 | 9/1974 | Yoda et al. . |
| 3,937,004 | 2/1976 | Natori et al. . |
| 3,999,050 | 12/1976 | Pitroda . |
| 4,162,610 | 7/1979 | Levine . |
| 4,246,650 | 1/1981 | Moritani et al. .................... 368/109 |
| 4,267,589 | 5/1981 | Yamaguchi ......................... 368/109 |
| 4,548,510 | 10/1985 | Levine . |
| 4,682,148 | 7/1987 | Ichikawa et al. . |
| 4,713,808 | 12/1987 | Gaskill et al. .................. 340/825.44 |

FOREIGN PATENT DOCUMENTS

| | | |
|---|---|---|
| 0106237 | 6/1985 | Japan ............................. 340/825.44 |
| 2146153 | 5/1985 | United Kingdom ........... 340/825.44 |

*Primary Examiner*—Donald J. Yusko
*Assistant Examiner*—E. O. Pudpud
*Attorney, Agent, or Firm*—William E. Zitelli; Vincent B. Ingrassia

[57] ABSTRACT

An electronic paging receiver for reminding a user of an important event includes a time of day clock for recording the time when a data message is received. The paging receiver computes a future alert time to remind the user of the receipt of the data message. Additionally, the user may enter a future alert time to generate a future alert. Further, the paging receiver is capable of detecting a special time/date field in the received data message to automatically generate a future alert.

22 Claims, 11 Drawing Sheets

| MESSAGE STORAGE AREA | INCOMING MESSAGE TIME / MESSAGE | ALERT SCHEDULE TABLE INDEX |
|---|---|---|
| 1 | 8:30 AM/ CALL HOME | 0 |
| 2 | 9:00 AM/ CALL OFFICE AT 5:30 PM | 1 |
| 3 | 8:05 AM/ CALL FRED AT 6:45 PM TOMORROW | 2 |
| 4 | 12:10 PM/ MOM WILL CALL AT 3:30 PM | 3 |
| | | |
| N−1 | | |
| N | | |

MESSAGE TABLE

*FIG. 4A*

| ALARM TABLE ENTRY NUMBER | TIME FIELD | DATE FIELD | ALARM FIELD | MESSAGE NUMBER |
|---|---|---|---|---|
| 1 | 5:30 PM | 3/4/88 | /D/ | 2 |
| 2 | 6:45 PM | 3/5/88 | /A/ | 3 |
| 3 | 3:30 PM | 3/4/88 | /PA/ | 4 |
| 4 | | | | |
| | | | | |
| N−1 | | | | |
| N | | | | |

FUTURE ALERT TABLE

*FIG. 4B*

PAGING RECEIVER CAPABLE OF REMINDING A USER OF AN IMPORTANT MESSAGE EVENT

BACKGROUND OF THE INVENTION

The present invention relates to communication systems and more particularly to a paging receiver capable of receiving and storing data messages, and in response to user input or data included in the data messages, serve to remind the user of an important message event.

BACKGROUND DISCUSSION

Communication systems in general and paging systems in particular using transmitting call signals have attained widespread use for calling selected receivers to transmit information from a base station transmitter to the receivers. This information has been transmitted using a number of well known paging coding schemes and message formats, such as POCSAG or Golay coding schemes. Over the past few years, the predominant code transmission schemes used to signal paging receiver devices have changed from sequential tone base systems to formats based on multidigit binary code word, and the services offered to the user have evolved from simple alert only and alert plus voice signalling to more complex multifunction alerting with visual readout of numeric and alphanumeric data.

Modern paging systems and paging receivers in particular have achieved multifunction capability through the use of microcomputers which allow the paging receiver to respond to information having various combinations of tone, tone and voice, or data messages. The prior art paging receivers have also provided such features as storing the data messages in a memory of the paging receiver for allowing the user to recall the messages at a later time. Other features have been the ability of paging receivers to provide a visual indication to the user of a message, visual indication of the time of day, the ability to store the message to be read at a later time, and the number of messages which have been received.

A typical memory display pager stores a plurality of received messages in a memory of the paging receiver. In the operation of such paging receivers, important factors involved in their successful operation is the portability of the receiver, the limited energy available to the receiver, the amount of memory available for the paging receiver's processing unit, the limited availability of the radio spectrum, the fast response time required in today's active society, and the number of paging receivers included in the paging system. In such paging receivers, in order that the drain on the battery may be minimized, the paging receiver is systematically turned off and on to maximize the length of time energy is available from the batteries, usually known as battery saving. The limited energy in which the paging receiver must operate limits the memory and minimizes the electronic circuitry such as the memory in the paging receiver. In the case of sending data messages, the data messages are limited because of the limited amount of memory available for operation of the paging receiver. Within these constraints, a commercially feasible paging receiver must operate.

A particular problem with prior art paging receivers has been the situation when an unattended paging receiver has received messages. This situation has left the paging user with some confusion as to when the message was received, or worse, the user is unaware a message has been received. One attempt to solve this problem has been the use of a "reminder chirp" which has been used in pagers such as Motorola's "BRAVO" paging receiver. In operation, the reminder chirp generates after a predetermined time an audible alarm after having received a message. For example, with the predetermined time set to ten minutes, the "reminder chirp" generates an audible alarm for an unread message after ten minutes have expired. However, a new incoming message can reset the reminder chirp timer again to ten minutes. If the new incoming message arrives within the ten-minute period, the reminder chirp is set ten minutes after receiving the new incoming messages.

Thus, since an incoming message resets the reminder chirp alert, a plurality of received messages could force the reminder chirp to alert only after the predetermined time is counted down from the last received incoming message. As is evident, this situation negates the usefulness of the reminder chirp.

Considering a specific example, assume a first incoming message is received at 2:00 PM and the reminder chirp is set for ten minutes. The reminder chirp will be scheduled to chirp at 2:10 PM. However, an incoming message received at 2:09 PM will force the reminder chirp to be scheduled at 2:19 PM and no audible alarm will sound at 2:10 PM. Continuing with this example, a message received at 2:18 PM will force the reminder chirp to be scheduled at 2:28 PM. As is evident, a plurality of sequentially received messages could totally negate the usefulness of the reminder chirp. Therefore, it would be highly desirable to have a paging receiver which reminds the user with a future alert based for each received message upon the time the incoming message is received.

Another particular problem with prior art paging receivers is the inability to realert the user based upon information received in the incoming message. For example, for a message containing "Meeting in the Boynton Room at 2:00 PM" being received at 12:05 PM, it would be highly desirable to remind the user the meeting is approaching with a future alert at 1:50 PM. Therefore, it would be desirable to have a paging receiver which schedules future alerts based upon information included in the data message.

SUMMARY OF THE INVENTION

The present invention has been developed for the purpose of reminding a paging user of an important event based upon time information included in a data message or based upon the time the message was received. Accordingly, the invention has as its object a method and device for scheduling future alerts based upon either user input or information included in the data message.

Another object of the present invention is to generate a future alert for a paging receiver based upon the time a message is received.

Another feature of the present invention is to allow a paging receiver user the ability to reschedule a future alert, delete a future alert, or change the parameters used to generate a future alert.

Another object of the present invention is to provide a paging receiver which generates a future alert, the future alert being one or more of an audible alarm, a vibratory alarm, a printing indicator, or a visual display indicator.

In general, a paging receiver of the present inventor includes a receiving means, a decoding means, a memory means, a time-of-day clock, and an alert means. The receiving means receives selective call signals having at least one data message. The decoding means decodes the selective call signals to recover the data message. The time-of-day clock is sampled so that the time the data message is received can be stored in the memory along with the data message. The decoding means being comprised of a microcomputer, computes a future alert time for the message. The future alert time can be computed based upon information in the data message, user input, or upon the time the message is originally received. The decoding means continuously compares the time from the time-of-day clock to the future alert time. When the time-of-day time matches the future alert time, the decoding means actuates the alert means. The alert means includes an audible alarm, a vibratory alarm, a printer, and a visual display indicator.

BRIEF DESCRIPTION OF THE DRAWINGS

FIG. 4A illustrates a plurality of messages stored in the paging receiver's memory.

FIG. 4B shows the entries in the future alert for generating future alarms in the paging receiver.

DETAILED DESCRIPTION OF A PREFERRED EMBODIMENT

In order to best illustrate the utility of the present invention, it is described in conjunction with a communication receiver, such as a paging receiver, capable of receiving and decoding selective call signals, the selective call signals including at least one data message. While the present invention is described hereinafter with particular reference to a paging receiver, it is to be understood at the outset of the description which follows, it is contemplated that the apparatus and method, in accordance with the present invention, may be used with numerous other communication receivers.

The paging receiver herein is associated with a paging system having a base station terminal, response to control and data information from the base station terminal, and in turn stores and provides data messages to a user during operation.

Figure 1:
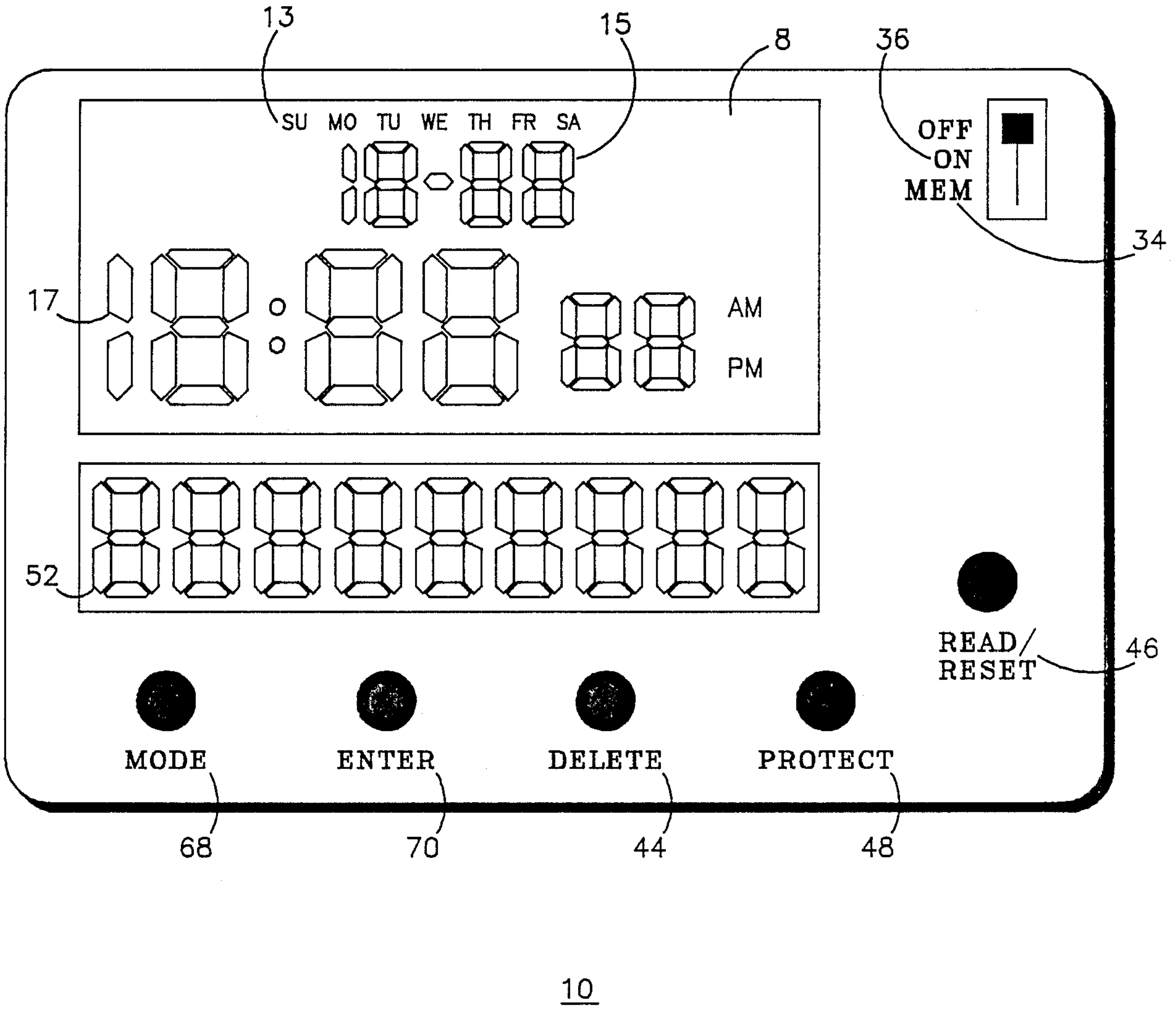
FIG. 1 illustrates a paging receiver for storing a plurality of messages and having a time of day display according to the present invention.

FIG. 1 illustrates a paging receiver 10, according to the present invention, capable of storing messages and having a time of day display 8, a message display 52, and a plurality of operating switches 34, 36, 46, 44, 48, 68, 70, according to the present invention. The time of day display 8 includes a day of the week indicator 13, a date indicator 15, and a time indicator 17. The day of week indicator 15 illustrates the day of the week. The date indicator 15 displays the date, and the time indicator 17 displays the time of the day (hours, minutes, seconds) including AM or PM indication. The operating switches provide input signals to operate the paging receiver 10 as described with reference to FIG. 2. The message display 52 provides the paging receiver user the capability of displaying any one of a plurality of messages stored in paging receiver 10.

Figure 2:
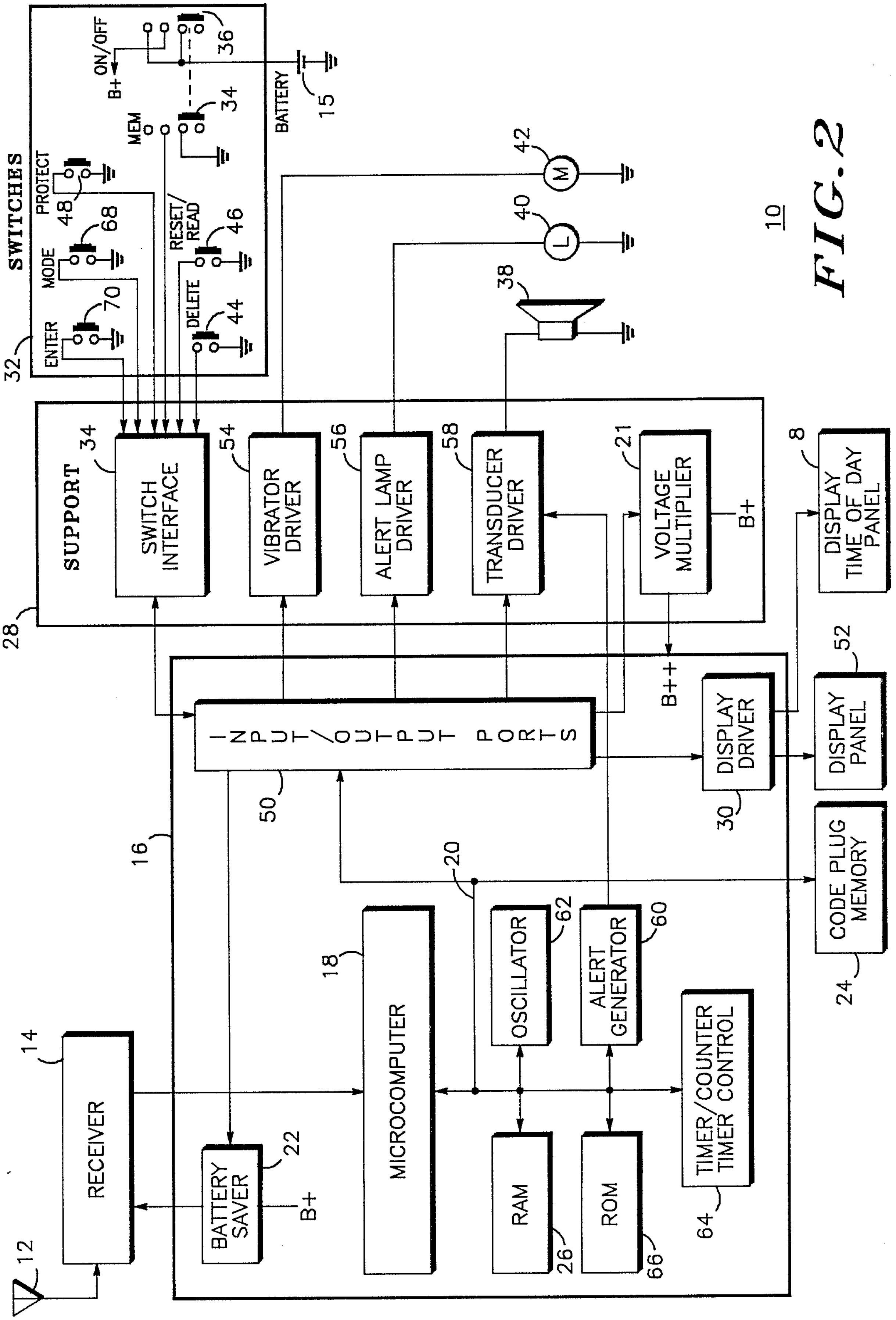
FIG. 2 is a functional block diagram of the paging receiver shown in FIG.1.

FIG. 2 is a functional block diagram of paging receiver 10 employing the present invention. An antenna 12 is shown coupled to a receiver 14. Receiver 14 detects and demodulates signals transmitted from a remote location over a radio frequency communication link. In operation, receiver 14 may use any of a number of frequency tuning techniques including crystal channel elements or digital synthesized frequency dividers and employ any of a number of modulation/demodulation formats including amplitude modulation and frequency modulation. For the purposes of the present invention, it is easiest to treat the receiver 14 as a well known frequency modulated (FM) receiver which includes channel elements to accurately tune and detect frequency modulated information. However, any number of types of other receivers may be used for generating an appropriate detected RF signal for analysis. The output of receiver 14 is coupled to an analysis and decoding system block 16 typically known as a decoder. More particularly, the output of receiver 14 is coupled to a microcomputer controller 18. While the term microcomputer is utilized, it will be appreciated by those skilled in the art that a number of custom programmed logic circuits could be utilized to achieve the same controlling function such as a program array logic. For the purposes of describing the preferred embodiment, the implementation of the paging receiver device employed in the invention will be by software stored in a memory portion of the microcomputer-based controller. Microcomputer 18 includes a common bus designated as 20 which is used to couple it to a variety of additional devices. Any of a number of microcomputers would be suitable, but a preferred device is an MC146805C4 or MC68HC11A8 microcomputer manufactured by Motorola, Inc.

Microcomputer 18 not only controls switching on and off receiver 14, it may also operate receiver 14 on an intermediate basis to extend the life of battery 15 through battery saver circuit 22. Receiver 14 outputs to microcomputer 18 which has an address decoder for comparing received address words with an address contained in a code plug memory 24 to determine if the particular paging receiver has been activated and to prevent the paging receiver from functioning if it has not been activated. Basically, the code plug memory 24 is operatively coupled to the microcomputer 18 such that when receiver 14 receives paging codes and corresponding selective calling signals, the microcomputer 18 actuates the code plug memory 24 and reads the unique coded contents thereof. If the received paging code matches the unique paging code stored in code plug memory 24, then the selective calling message associated with the received paging code is stored in memory means 26.

It is noted that the paging receiver in FIG. 2 has the capability of storing selective call message signals in memory 26 or providing them to support unit 28 or display driver 30 for readout according to the state in which a plurality of switches of switching means 32 are set. A switch interface 34 provides I/O capability between switching means 32 and microcomputer 18. More specifically, the switching means 32 includes switches 34–36 for passing alert signals to alert annunciators 38, 40, and 42; switches 44–48 to control the storage, protection, and retrieval of messages stored in memory 26; and switches 68 and 70 to control entering future alert information into the paging receiver 10.

For example, the protect switch 48 permits the user to select a protected message location included in memory 26 from being destroyed Switch 46 allows the user to read a particular memory location in memory means 26. Switch 44 allows the user to delete a message from a memory location included in memory means 26. Switches 34 and 36 permit the user to select one of the alerts 38–42 which typically comprise lights, light emitting diodes, speakers, or other annunciators. Switch 68 is used to set the paging to one of a plurality of operating modes or states and switch 70 permits data to be entered into the paging receiver.

Continuing our discussion with reference to FIG. 2, microcomputer 18 decodes the address data in a known fashion and compares the results with the predetermined address contained in code plug memory 24 to produce output signals to process the message data, to store the message data, and to alert the user that a message has been received. Microcomputer 18 communicates through bus 20 with other elements of the paging receiver via input/output ports 50. One of the output signals from the microcomputer 18 is supplied to display driver 30 to produce an alphanumeric display of the data on message display panel 52 or to produce time information on time of day display panel 8. Other output signals are supplied to a support module 28 to selectively enable a vibrator driver 54, an alert lamp driver 56, or a transducer driver 58. Other signals are applied to battery saver unit 22 and switch interface 34. Microcomputer 18 also controls an alert generator 60 which causes tones produced by transducer driver 58 to be applied to speaker 38.

A clock signal derived from an oscillator 62 is applied to the microcomputer 18 to control the rate at which the signals, including the data messages, are processed. It is understood that microcomputer 18 uses oscillator 62 as is well known in the art for controlling internal operations as well as its interface with other elements of the paging receiver 10, such as timer control 64. Timer control 64 provides microcomputer 18 time and interrupt information in a manner well known in the art. The time information is used to update the time of day display 8 and to process the data according to the flow diagrams in FIGS. 5 through 11. Basically, timer control 64 is an electronic clock for determining the actual date and time-of-day as a number of functions including minutes, hours, days and months. The microcomputer 18 is coupled by a data bus 20 to read only memory 66 and by data bus 20 to random access memory 26. The RAM 26 includes a plurality of message storage areas and is adapted to store the data message which microcomputer 18 converts from the received encoded paging information signals and to process these signals, including decoding, and to appropriately store the data messages in designated memory location areas of RAM 26. The programs or routines to operate microcomputer 18 according to the present invention are stored in ROM 66 and are explained generally with respect to FIGS. 3–11.

In the paging receiver 10, the data messages received and decoded are stored by microcomputer 18 in message storage areas of RAM 26. The messages can be retrieved by the user by notifying microcomputer 18 through the process of activating the read switch 46 to read an appropriate memory storage area to display the message via display driver 30 on display panel 52. Once the message is stored in memory, the paging user may desire to continue such storage and to defer message readout. Alternatively, the user may desire to interrogate RAM 26 to determine if any message has been stored therein while the paging receiver was selected for later readout when so instructed by switches 34 and 36. To initiate such interrogation to read out RAM 26, the paging user activates switch 46 to cause the microcomputer 18 to read out a memory location out of RAM 26. The subsequent activation of read switch 46 causes microcomputer 18 to step through the plural population of memory storage areas displaying their contents. In addition, after reading the data message, the user can either delete the message by activating the delete switch 44 or protect the message from destruction by activating the protect switch 48. Additionally, mode switch 68 allows the user to enter time information with respect to the selected message to remind the user of an important event. The enter switch 70 permits the user to appropriately select and modify time input for generating future alerting information.

It is noted that the description of the pager operation given above is general in nature. More details of a pager operation are found in U.S. Pat. No. 4,412,217 entitled "Pager with Visible Display Indicating Status of Memory" assigned to the present assignee which disclosure is hereby incorporated by reference.

The following flow charts refer to the operation of microcomputer 18. The programs that are described by the flow charts are stored in ROM 66 in a predetermined sequence to cause the operation of the microcomputer 18 for operating on the data messages to schedule, delete, or modify future alerts. Other routines for the operation of the paging receiver are included in ROM 66, however, the routines are not described herein since they are not needed for the understanding of the present invention.

Figure 3:
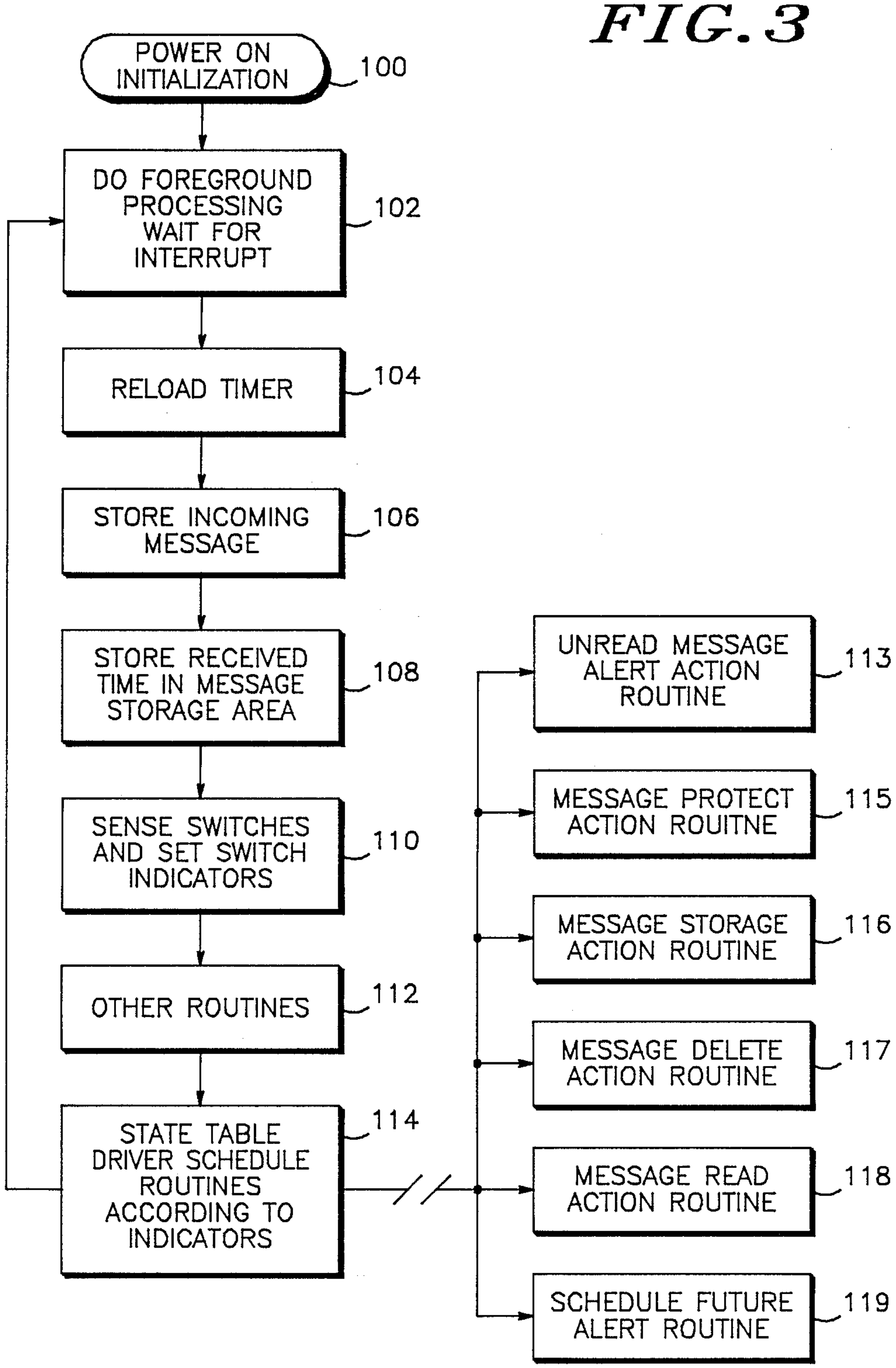
FIG. 3 is a flow chart showing the scheduling of the message action routines by the software background process.

The present invention relates to a method for generating future alert signals to remind the pager user of an important event. FIG. 3 illustrates the overall flow diagram of the paging receiver for receiving, storing, and processing the data messages in a plurality of message storage areas included in RAM 26. The operating software of the paging receiver is separated into foreground and background processes. The foreground process performs functions well known in the art such as decoding data from the receiver and battery saving processing. The foreground processes are not described herein since they are not needed for the understanding of the present invention. The background process illustrated in FIG. 3 include those routines for effecting the future alerting of the data messages.

Referring to FIG. 3, initially the paging receiver is powered up and housekeeping techniques well known in the art are performed to initialize the buses and peripheral equipment connected to the microcomputer 18, step 100. The microcomputer is placed in a condition for the reception of information via the foreground process, step 102. Referring to step 102, when a timer internal to microcomputer 18 counts to zero, the foreground process is interrupted and the microcomputer is vectored to step 104 of the background process. Typically, these timer interrupts occur once every 77.5 ms. and the internal timer is reinitialized in step 104 such that an additional interrupt occurs in another 77.5 ms.

After reloading the timer, the microcomputer checks for the successfully decoding of an incoming message. If an incoming message is detected and successfully decoded, the incoming message is stored and an incoming message flag is set for notifying other routines of the receipt of an incoming message, step 106.

Next, the method senses the activations of any switches through the switch interface 34, step 110. The switches determine which message storage area to address, display, protect, delete, read, or schedule a future alert. Essentially, sensing the switches sets a series of flags to indicate whether one of the switches has been activated. Other routines, such as low battery test, alert generator routine for generating an alert, and internal housekeeping are then executed, step 112. The other routines are not described herein since it is not necessary for the understanding of the present invention.

In step 114, a state table driver picks up vectors and indicators from the foreground process, background process, and other processes and appropriately directs the background process to one of a plurality of routines 113, and 115–119 for processing the messages according to the action of the user. For instance, if the user activates the mode switch, the sense switch routine 110 sets a mode flag and the state table driver schedules a future alert routine to permit the user to schedule a future alert.

The flow charts for the future alert routines are illustrated in general with respect to FIGS. 5–11. It is to be understood that the above described embodiment of the background process is illustrative only, and that modifications thereof may occur to those skilled in the art, depending upon the particular paging receiver. The following routines describe the future alert routines for the present invention to allow the user to schedule future alerts and to permit the microcomputer to automatically schedule future alerts depending upon the informational content of the data messages.

By way of example, consider now the tables shown in FIGS. 4A–B. FIG. 4A is a message table illustrating in tabular form a plurality of message storage areas. Each received message is assigned to a message storage area 1, 2, ... N−1, N. It is not necessary that the messages be in chronological order since an incoming message will be stored in the first available empty message storage area. In the operation of the system, the time the message is received is stored in the message storage area. Additionally, if a future alert is scheduled, an entry into a future alert table is stored in the corresponding message storage area's alert schedule table index.

The future alert table is illustration FIG. 4B. The future alert table includes a plurality of entries for scheduled future alert events. Each event includes a time, a date, an alert indicator and a message number. The time signifies a future time for generating an alert. The date notifies the system as to the date the future alert occurs. The alert indicator represents one of a plurality of alarms. For instance, D signifies visually displaying the message upon occurrence of the future alert. A corresponds to generating an audible alarm. P represents printing the message. V specifies a vibratory alarm is to be generated. Note that a plurality of alarms may be included in one alert field. For example, DA signifies a message is to be visually displayed and simultaneously an audible alarm is sounded. Finally, the message number correlates to the message for which the future alert is generated.

For example, considering FIGS. 4A–B in somewhat further detail, message 3 "Call Fred at 6:45 PM tomorrow", has a future alert scheduled at 6:45 PM on 3/5/88. The alert takes the form of an audible alarm. Thus, at 6:45 PM on 3/5/88 the pager will generate an audible alarm with the number "3" appearing in the display. Note that if the alert field included a "D", the message will be automatically displayed. Considering another example in FIGS. 4A–B. Entry 3 in the future alert table causes message 4 to be printed along with an audible alarm at 3:30 pm on 3/4/88. For purposes of clarity, reference will be made to FIGS. 4A–B hereinafter.

Figure 5:
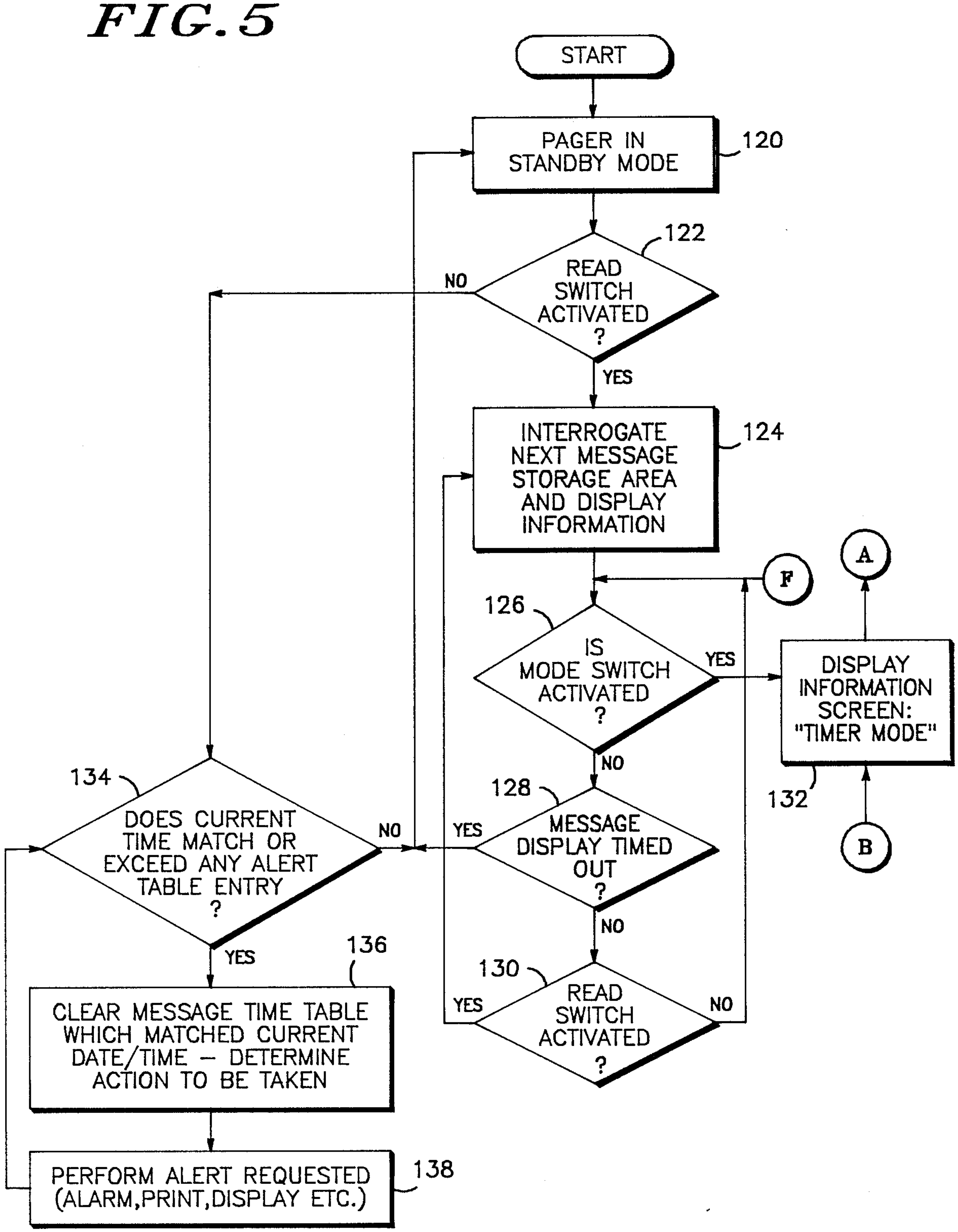
FIG. 5 is a flow diagram illustrating the process for generating a future alert in the paging receiver.

Referring now to FIG. 5, there is shown a flow chart of one of the future alert routines to allow the user to select a future alert time, deselect a future alert time, or select a particular alarm to occur at the future alert time. To begin, the pager is initially in the standby or wait mode, step 120. The paging receiver then determines whether the read switch is activated, step 122. If the read switch is activated, this notifies the paging receiver that the user wishes to interrogate a message storage area in the paging receiver Upon activating the read switch, the paging receiver interrogates the message storage area and displays the message in the selected message storage area, step 124. The paging receiver then checks to see if the mode switch is activated, step 126. If the mode switch is not activated, the system determines if the message being displayed has timed out, step 128. If the displayed message has not timed out, the paging receiver senses the read switch to determine if it is activated again, step 130. If the read switch is activated, the next message storage area is selected and displayed, step 124. If the read switch is not activated, the paging receiver repeats steps 126–128 to determine if the mode switch is activated or the message is timed out.

Referring back to step 128, if the message display does time out, the paging receiver returns to the standby mode 120. Referring back to step 126, if the mode switch is activated, this signifies that the paging user desires to perform a future alert function Upon activation of the mode switch, the pager displays on the display screen "timer mode" to notify the user that the pager has been set to enter information, step 132. The entering of information and scheduling of future alerts is described with reference to FIG. 6.

Referring back to step 122, if the read switch is not activated, the paging receiver compares future alert times and future alert dates stored in the future alert table to the current time and date in the paging receiver, step 134. Reference is made briefly to FIG. 4B which shows an illustrated example of the future alert table. The future alert table is contained in RAM 26 and includes for each selected message the time field, the date field, an alarm field, and the corresponding message number. For example, entry 1 illustrates displaying message number 2 at 5:30 PM on 3/4/88. A further example is shown in entry 2 which illustrates that an audible alarm will be generated at 6:45 PM, 3/5/88 for message 3. As is evident, numerous alerts can be generated, depending upon message and time.

Referring back to step 134 of FIG. 5, if the current time exceeds or matches the current time, the paging receiver clears the entry from the future alert table and determines the alert to be generated, step 136. Referring briefly to FIG.4B, if the current time in the paging receiver is 5:30pm, 3/4/88, the first entry of the future alert table will be performed. That is, the paging receiver will schedule message 2 to be displayed at this time. In general, the alert may take the form of an audible alarm, visual display, print, vibrate, or combination of any, step 138. The paging receiver then returns to step 134 to determine if another entry in the future alert table is scheduled for an alert. If the current date time does not match another entry in the future alert table, the pager is returned to the standby mode, step 120.

At this point it is important to note that for simplicity in explaining the process of the present invention, the future alert table is scanned only when the pager is in the standby mode. As is evident, the future alert table can be scanned at a higher rate to ensure that no future alerts are delayed for an unreasonable period of time. For example, scanning the future alert table may occur between steps 128 and 130 to cause an alarm to be generated even if a user is reading a message.

Figure 6:
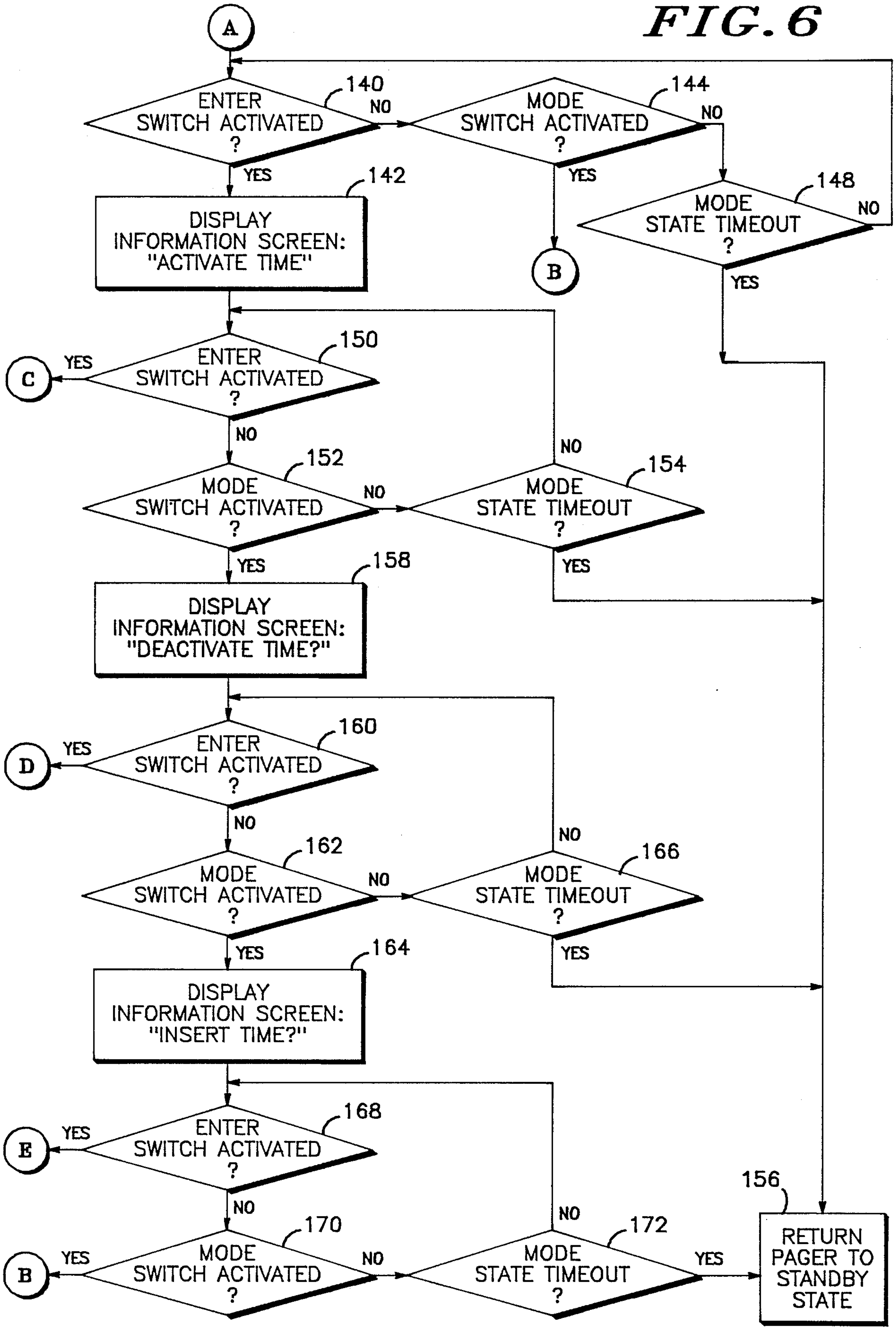
FIG. 6 is a flow chart describing user interaction to either activate or delete a future alert.

Referring now to FIG. 6, there is shown a continuation of FIG. 5 through flow connector A. Briefly, the flow chart of FIG. 6 is entered when the mode switch is activated signifying that the paging user desires either to insert or remove an entry in the future alert table. Referring briefly back to FIG. 5, the display screen displays "timer mode" when the mode switch is activated, step 132. If the mode switch is activated, the paging receiver then determines if the enter switch is activated, step 140 of FIG. 6. If the enter switch is activated, this signifies that the user wishes to enter the timer mode. In the timer mode, the user may enter an entry in the future alert table or delete an entry in the future alert table. Referring to step 140, if the enter button is activated after the paging receiver displays "timer mode", the paging receiver generates a prompt to determine if the user desires to enter an entry in the future alert table, step 142. The paging receiver then displays "activate time". If the user does not desire to enter the "activate time"routine, the user instead activates the mode switch, step 144. If the user activates the mode switch, the paging receiver returns to prompting the user to enter the "timer mode" in step 132 of FIG. 5. If the mode switch is not activated, the paging receiver determines if inactivity of the mode switch and enter switch have created a time-out condition, step 148. The time-out condition insures that if no action occurs by the user within a certain period of time, the pager will return to a standby state, step 156. If a time-out has not occurred, the paging receiver returns to step 140 to determine the enter switch has been activated again.

Referring back to step 142, if the enter switch is activated, the display screen prompts the user to determine if the user desires to insert an entry in the future alert table, step 142. If yes, the user activates the enter switch, step 150. Entering an entry into the future alert table is described with reference to FIG. 7.

If the enter switch is not activated, the system determines if the mode switch is activated, step 152. If the mode switch is not activated, it is determined whether a time-out has occurred due to inactivity by the paging user, step 154. If no activity occurs the paging receiver times out and returns to the standby state, step 156.

Referring back to step 152, upon activating the mode switch, the display prompts the user to determine whether the user desires to "DEACTIVATE THE TIME", step 158. If the user desires to deactivate an entry in the future alert table, the system senses if the enter switch is activated, step 160. However, the user may desire to continue on with a different mode and the system senses if the mode switch is activated, step 162. If the mode switch and enter switch are not activated for a predetermined time-out period, the system returns the pager to the standby state, step 166 and step 156.

The user, however, may wish to insert a new entry in the future alert table. This is accomplished by the activation of the mode switch, step 162. Upon activation of the mode switch, the system displays "insert time" on the display screen, step 164. If a new entry is to be inserted in the future alert table, the enter switch is activated, step 168. The insertion of a new entry in the future alert table is explained with reference to FIG. 9. If the enter switch is not activated, termination of the timer mode may be accomplished by activating the mode switch, step 170, which returns the system to displaying "timer mode" on the display screen as illustrated in step 132 of FIG. 5. If the enter switch or the mode switch is not activated within a predetermined time-out period, the system returns the pager to a standby state, steps 172 and 156.

Figure 7A:
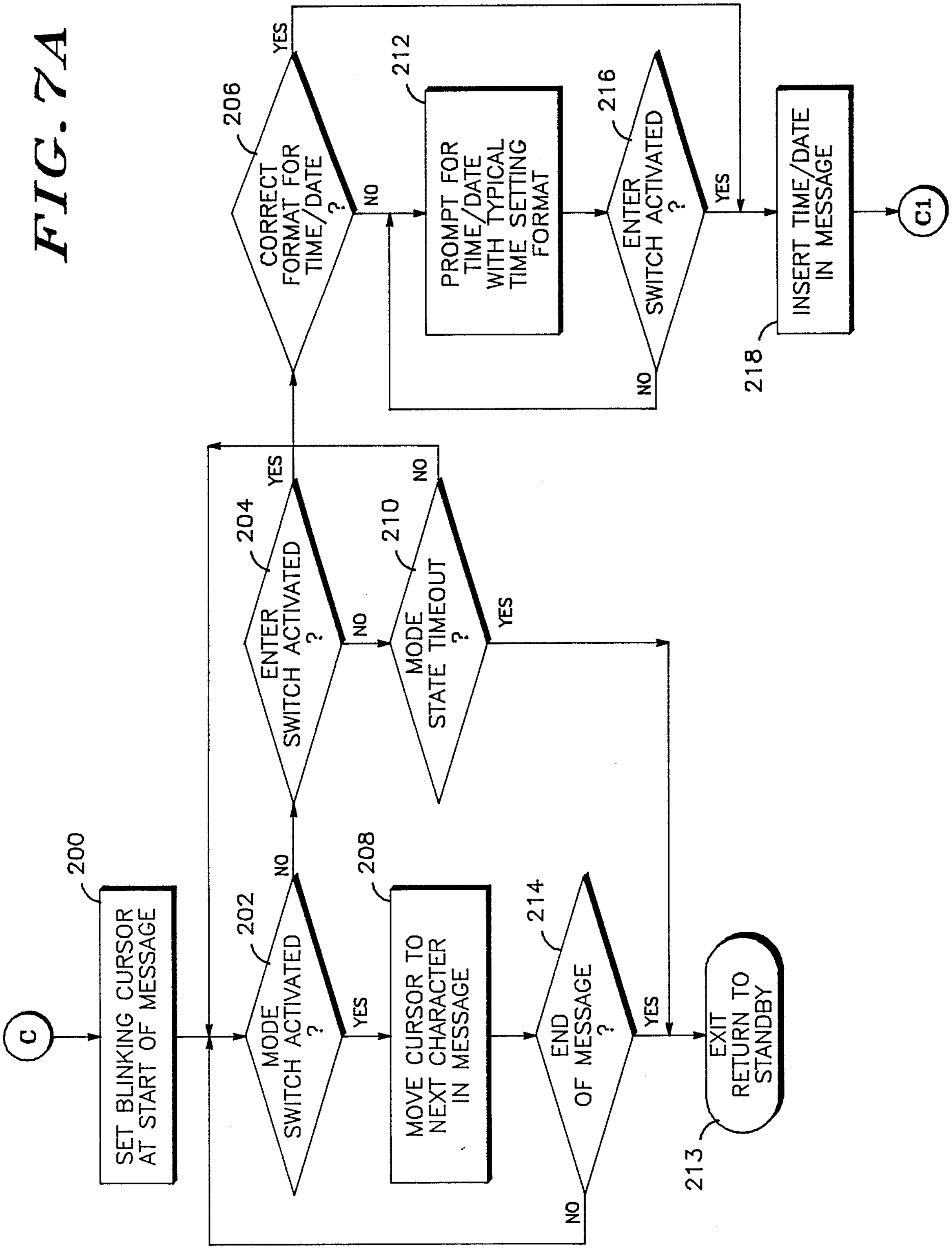
FIGS. 7A and 7B, in combination, depict a detailed flow diagram for inserting an entry into the future alert table.
Figure 7B:
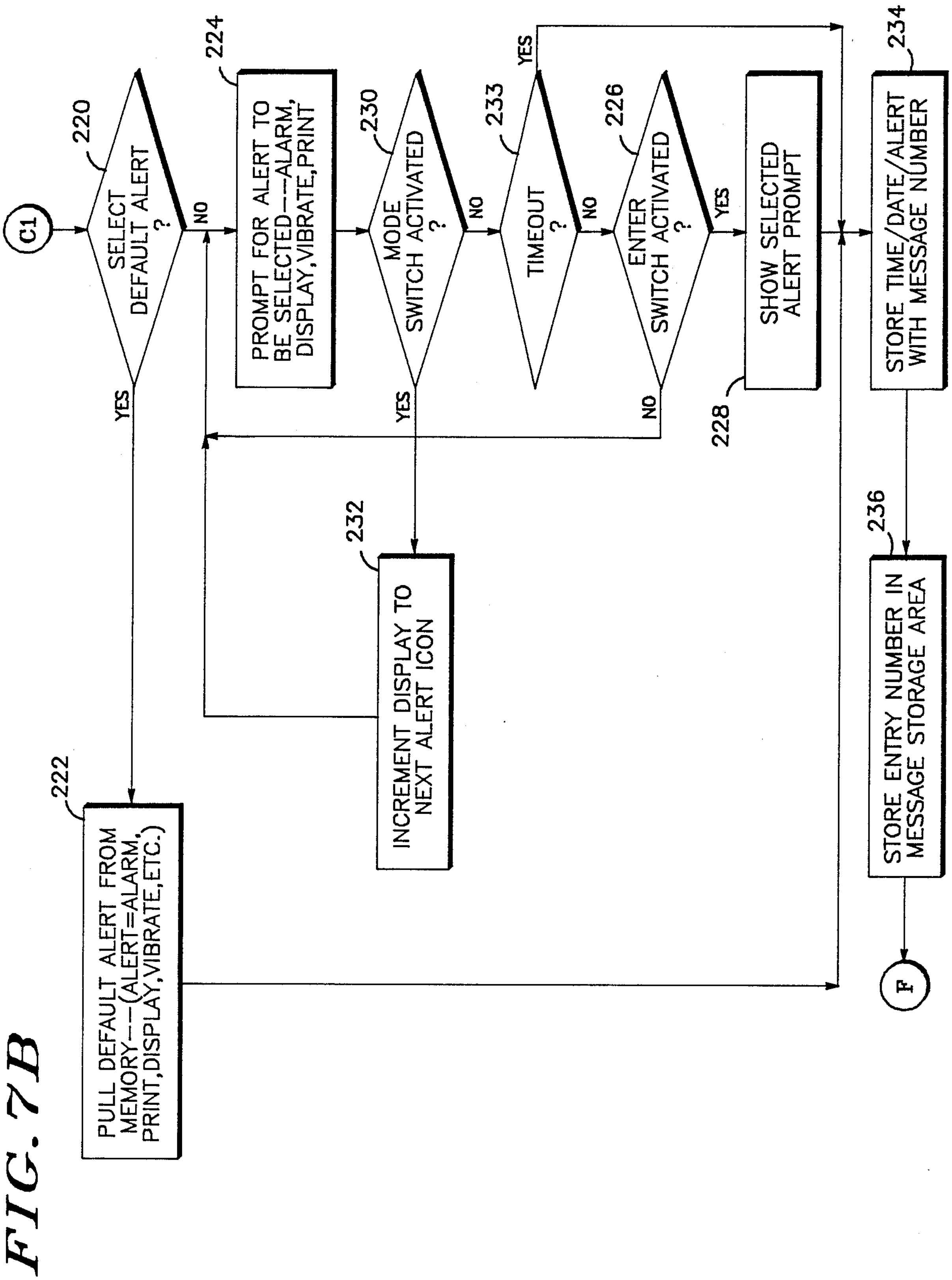

Referring now to FIGS. 7A and 7B, there is shown a flow chart for inserting a new entry into the future alert table. To briefly recapitulate, reference is made to FIG. 4B. FIG. 4B illustrates a future alert table stored in RAM 26. The future alert table includes a plurality of entries in which each entry includes a time field, a date field, an alert field, and a message field. The time field includes the time of day for the future alert. The date field comprises the date for future action, the alert field signifies what type of alert is to be performed. Finally, the message number associates the message stored in RAM 26 with the entry in the future alert table. The time field is compared with the current time to determine if the entry is to be acted upon. The date is compared with the current date to determine if this is the date the message is to be acted upon. The alert field represents what alert is to be generated when the current time matches the time-date field in the future alert table entry. For example, if the alert is to generate an audible alarm, an A is stored in the alert field If the alert is to display the message, a D appears in the action field. If the message is to be printed on an external printer, a P appears in the alert field For example, referring to the first entry in FIG. 4B, the entry is decoded as message 2 is displayed at 5:30 pm on 3/5/88. Similarly, the second entry is interpreted as message 4 is displayed on the display at 1:45 PM on December 15, 1987. As is evident, a plurality of entries can be stored in the future alert table for generating subsequent alerts by the paging receiver to notify the paging user of a pending important event.

Referring back to FIGS. 7A and 7B, a future alert table entry can be generated in one of two methods. The first method is for the user to select a time field already included in the message to store in the future alert table If a time field does not occur in the message, the user is prompted for manually setting the time and date for a new entry in the future alert table. The method begins by setting a blinking cursor at the start of the message to alert the user to the fact that this may be the beginning of a time date field, step 200. If this is not the beginning of a time date field contained in the message stored in memory, activating the mode switch, moves the cursor to the next character in the message, steps 202 and 208. The method then determines if this is the end of message, step 214. If this is the end of message, no time date field occurred in the message and the method exits and returns the pager to a standby state, step 213. If this is not the end of the message, the cursor moves through the message by subsequent activation of the mode switch. If a time date field is included in the message, the user activates the enter switch, step 204. If the mode switch or enter switch are not activated within a predetermined time-out period, the system reverts to the standby state, step 210.

Referring back to step 204, if the user has found a time date field included in a message stored in the paging receiver, the enter switch is activated, step 204. The system then determines if the time date field included in the data message is of the correct format 206. Note also that if a time date field does not occur in the message stored in memory, subsequent activation of the mode switch followed by the enter switch will allow the user to be prompted for a time date setting, step 212 If the field selected does not contain the correct format for the time-date field or is not even the time-date field, the system prompts the user to manually enter the time date, steps 212–216. However, if the user has selected a correct time date field included in the data message, the method automatically inserts the time date field along with the message number in the future alert table, step 218. Referring back to step 206, if the correct format for the time-date field is not found, the system prompts the user to manually enter the time-date into the future alert table, steps 212 and 216. This is accomplished similar to setting the time and date in a watch, which is well known to those of ordinary skill in the art. Eventually, the time-date is entered into the future alert table either automatically or manually by the user, step 218.

The system then determines what type of alert is to be generated by the paging receiver upon the current time matching or exceeding the time-date field in the alert table, step 220. This occurs in one of two methods. In the first method; the alert selected is a default alert determined by preselected settings in the code plug, step 222. Basically, the code plug is programmed at the factory and the user can select the type of alert to be generated by the future alert entry. The code plug is programmed with a default alert or alerts to be used. This may include generating an audible alarm, printing, a visual display alert, vibrator alert, or combination of any, step 222.

If no default alert is to be generated, then the user is prompted for the alert to be selected, step 224. The alerts are displayed on the paging receiver and selected in a predetermined manner in which the audible alarm may be displayed first. If the audible alarm alert is to be generated by the entry in the future alert table, the enter switch is activated and the selected alert is stored in the future alert table, steps 226 and 228. However, if a particular alert icon display is not the desired alert, activating the mode switch causes the display of the next alert icon, steps 230 and 232. For example, the first alert icon to be selected may be the audible alarm icon If the user does not wish to select the audible alarm, the mode switch is activated and the display alert icon is displayed. If the user does not wish to activate the display alert, subsequent activation of the mode switch may cause the vibrate alert icon to be displayed. Eventually, the user will select one of the alerts displayed or time-out occurs and the paging receiver will store the time date field and action field with the message number in the future alert table, steps 233–234. Finally, the entry number is set in the message storage area to be used by the paging receiver to notify the paging receiver that the message has an entry in the alert table, step 236. The paging receiver is then set to the querying the user for a different operating mode.

Figure 8:
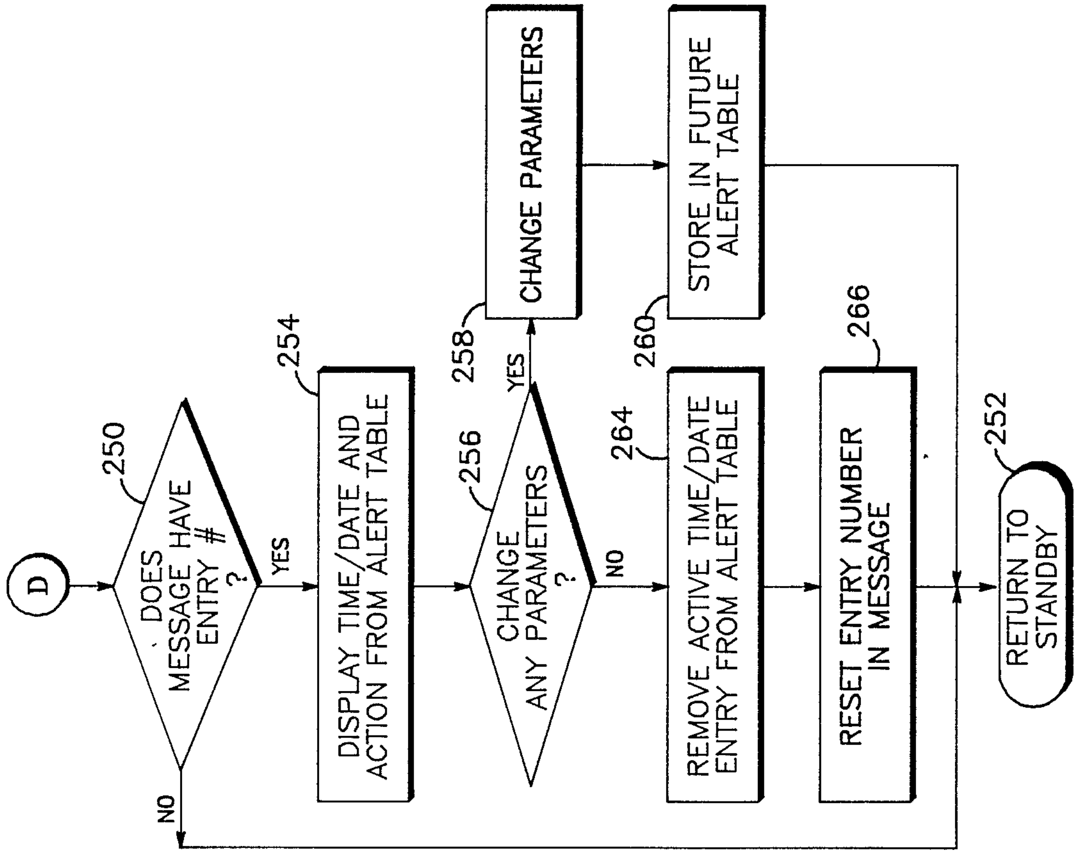
FIG. 8 is a detailed flow chart illustrating the process of changing any of the parameters for a future a;ert table entry.

Referring now to FIG. 8, there is shown a method for removing an entry from the future alert table or changing any of the parameters in the future alert table to generate another alert. The method first determines whether the message under consideration includes an entry number into the future alert table, step 250. If the message does not have an entry number, this signifies that the message does not have a corresponding entry in the future alert table. If the message does not have an entry number in the alert table, the pager is returned to the standby state, step 252. If the message does have an entry number, the entry number is recalled from the future alert table and displayed, step 254. The entry is displayed with the time, date and alert. The method then queries the user whether there are any changes to the parameters, step 256. This may be accomplished by the user activating the enter switch. If changes are to be made to any of the parameters, the user activates the mode button to change the appropriate character in the field, and by subsequent activation of the enter switch, the selected character for the field is stored in memory. This particular method of changing parameters is similar to changing time characters in a digital watch and is well known to those of ordinary skill in the art. After the parameters have been changed, step 258, the parameters are stored in the future alert table, step 260. The paging receiver is then returned to the standby mode, step 252. Referring back to step 256, if none of the parameters are to be changed, the entry is removed from the future alert table, step 264. The entry number associated with the message in the message table is reset to signify that the entry has been deleted from the alert table, step 266. The paging receiver is then set to the standby mode, step 252.

Figure 9:
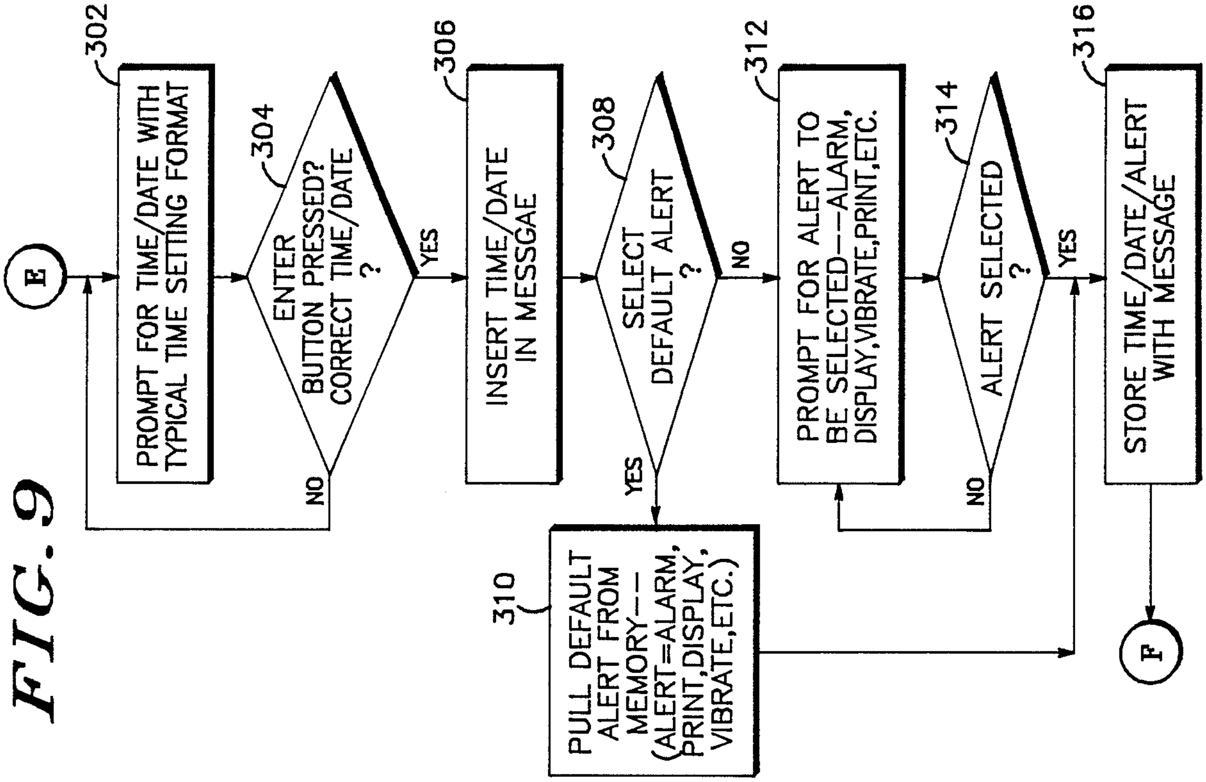
FIG. 9 is a detailed flow diagram describing a user's action to insert an entry into the future alert table.

Referring to FIG. 9, there is shown a method for inserting a new entry into the future alert table. The method begins by prompting for the time-date field for generating an alert for the message selected, step 302. The time-date field is entered using a typical watch type entry method in which each time-date character is entered independently of one another by the user. After the time-date has been set, the user may enter the time and date by activating the enter switch, step 304. If the correct time and date have been entered, the method inserts the time-date in an available entry slot of the future alert table, step 306. At this point, either a default alert or the user may select the alert to be generated, step 308. If a default alert is to be generated, the default alert is recalled from the code plug memory, step 310. The default alert is typically preprogrammed into the code plug at the factory as requested by the user. Referring back to step 308, if the default alert is not generated, the paging receiver prompts the user for the alert to be selected, step 312. This is similar to steps 220–234 of FIG. 7B. If the alert desired by the user is selected, the time, date alert, and message number are stored in the event slot, step 314 and 316. Along with the time field, date field, alert field, and message number being inserted in an available event slot in the future alert table, the number of the event slot corresponding with the message is inserted into the message storage area. This is to correlate any future alerts with a message in the message storage areas.

Thus, there has been shown a method to allow a user to manually select a message for a future alert at a user selectable time. The system also allows the user to select a plurality of alerts to be generated at the selected future alert time. Finally, entries in the future alert table can be deleted to terminate the future alerting of the message.

Figure 10:
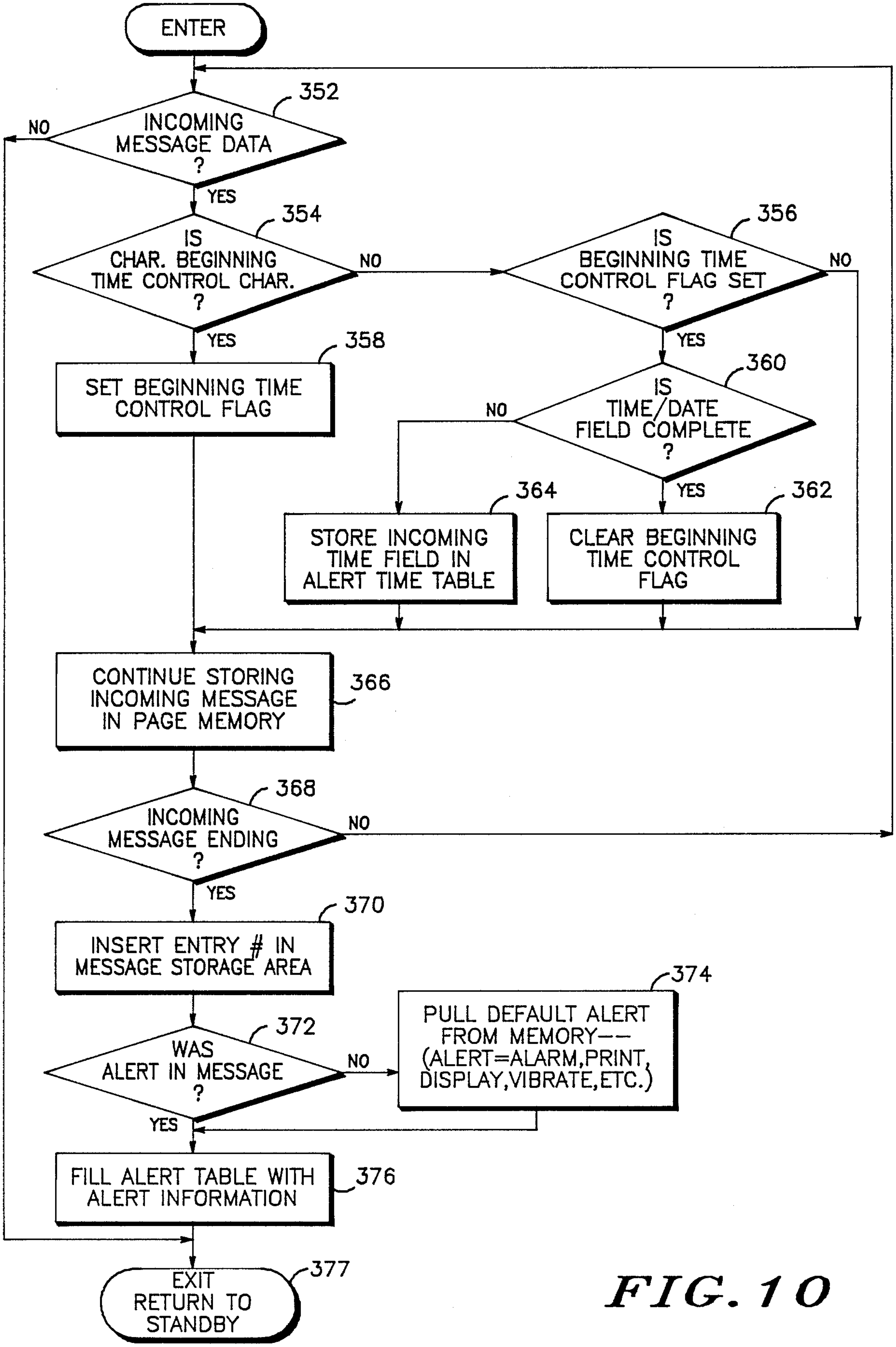
FIG. 10 illustrates a detailed flow diagram for automatically inserting an entry into the future alert table by the decoder.

Referring now to FIG. 10, there is shown a method for the paging receiver to automatically insert an event in the future alert table. The method begins with the paging receiver waiting for incoming message data, step 352. Eventually, an incoming messages is received by the paging receiver and the paging receiver scans the message for a special time control character, such as a control A, to notify the paging receiver that an event should be inserted in the future alert table. The paging receiver begins by checking the first character in the incoming message data, step 354. If the character is a tie control character notifying the user that the message contains a time field for inserting an event in the future alert table, the method sets a control flag, step 358. The method then stores the incoming message in memory and checks for an end of message, steps 366 and 368. Since the end of the message will not occur on the first character if it is a beginning of time control character, the method loops back to decode more information, step 352. Since the next character is not a time control character, the method proceeds to check the time control flag, step 356. If the time control flag is set, the subsequent data will include the time, date and alert fields, step 360. Typically, the fields following the control character will be in the format for the time field, date field, and the alert requested. The method finds an available empty event slot in the future alert table and inserts the time field, date field, and alert requested in the event slot, step 364. Continuing, the method stores the incoming information in memory, step 366. The method then determines if the end of the message is received, step 368. If the end of the message is not received, the pager continues receiving incoming information, step 352. Since the control character is situated at the beginning of the time, date, alert fields, the method loads the parameters contained in the message in the event slot of the future alert table. When the alert field is loaded into the event slot, the paging receiver clears the control flag and continues storing the incoming message in page memory, steps 362–368.

Referring back to step 368, eventually the end of the message is received and the entry number associated with the message is stored in the message storage area, step 370. The paging receiver then confirms if an alert field was present in the message, step 372. If an alert was not present, a default alert is loaded into the future alert table, steps 374–376. The paging receiver then returns the paging receiver to the standby mode waiting for the time of day clock in the paging receiver to compare with one of the time fields in the future alert table. A match causes the paging receiver to generate an alert.

Figure 11:
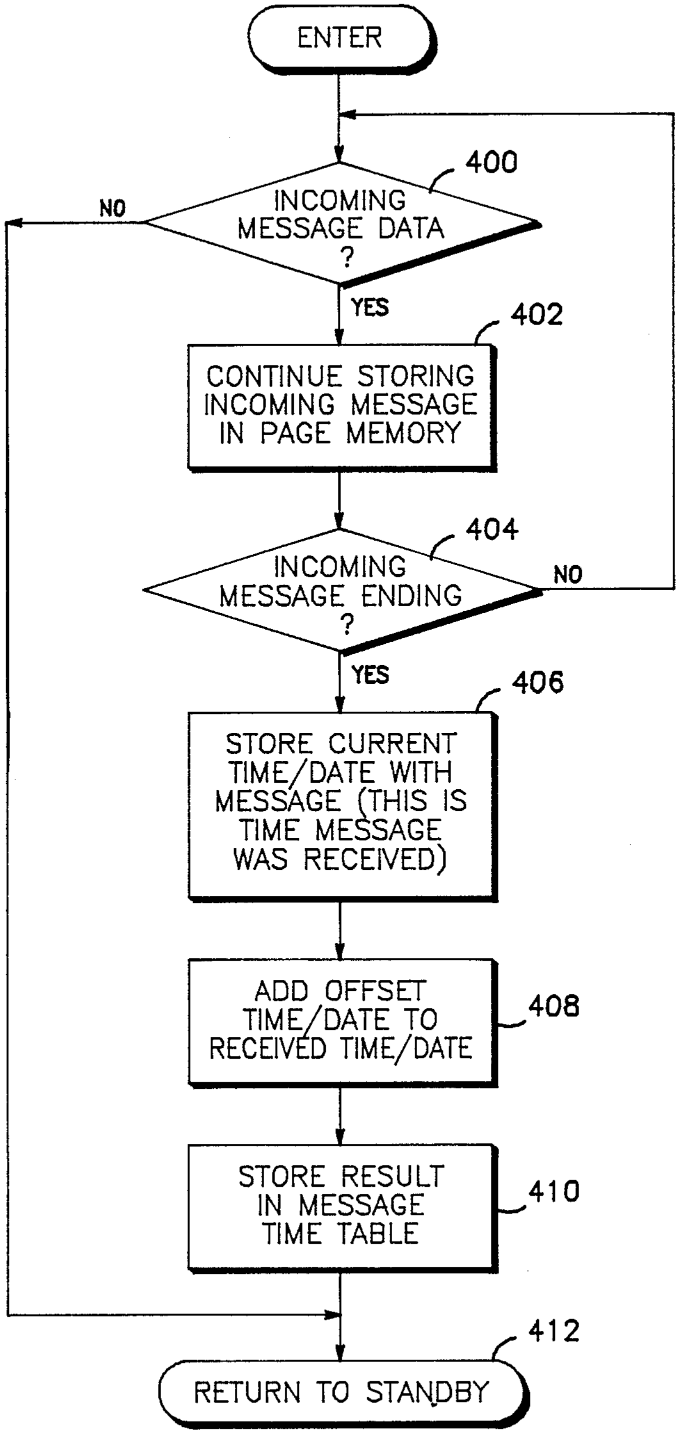
FIG. 11 illustrates a flow chart describing a method for generating a future alert time based upon the time the message was received.

Referring now to FIG. 11, there is shown a method for generating a reminder alert for each message based upon a predetermined differential offset time stored in nonvolatile memory such as the code plug. To begin, the paging receiver is in a standby state waiting for incoming message data, step 400. Eventually, an incoming message is received by the paging receiver and the method stores the message in the message storage area, steps 402–404. The paging receiver continues storing the incoming message in the message storage area until the end of the message is received, step 404. When the end of the message is received, the original received time is stored with the message in the message storage area, step 406. A predetermined time is recalled from the nonvolatile memory is added to the originally received time, step 408. The time along with the date and a default alert which has been previously stored in the nonvolatile memory is stored in an available event slot in the future alert table, step 410. The paging receiver then returns to standby state, step 412.

In operation, after a message is received, the predetermined time is added to the time when the message is received and stored in the future alert table. When the current time in the paging receiver matches any one of the future alert times as stored in the event slots of the future alert table, an alert is generated for notifying the user of an important event. It is also understood that steps 400–412, can be used in other routines included herewithin to store the received time of an incoming message in the time field. For clarity, the steps for storing the received time were described only once, it being understood that upon receiving an incoming message the received time is automatically stored in the associated message storage area.

What is claimed is:

1. A paging receiver operative to receive a data message of a transmitted call signal including a field containing time data ad to generate a future alert signal corresponding to said data message and based on said time data thereof, said paging receiver comprising:

memory means for storing data;

a time of day clock for generating a signal representative of instantaneous time of day;

an alarm means for generating an alert signal;

means for receiving the call signal and decoding the data message therefrom;

means for reading the time data from the decoded data message;

means for storing the decoded data message and correspondingly read time data into respectively assigned portions of said memory means;

means for computing a future alert time corresponding to the decoded data message based on the stored time data read therefrom;

means for storing the future alert time in the memory means;

means for comparing the stored future alert time to the signal generated by the time of day clock;

and activating the alert means when said time of day signal matches substantially the stored future alert time.

2. The paging receiver of claim 1, wherein said alert means is an audible alarm.

3. The paging receiver of claim 1, wherein said alert means is a vibratory alarm.

4. The paging receiver of claim 1, wherein said alert means is a printer.

5. The paging receiver of claim 1, wherein said alert means is a visual display.

6. The paging receiver in accordance with claim 1 wherein the data message includes a control character to demarcate the time data field thereof; and wherein the reading means includes:

means for locating the time data field within the decoded data message utilizing the control character thereof; and means for reading time data from the located time data field for storage in its assigned portion of the memory means.

7. The paging receiver in accordance with claim 1 including:

means for determining that an improperly formatted time data field exists in the decoded data message;

a display for displaying the decoded data message to a user; and means for prompting the user to enter into the paging receiver time data corresponding to a future alert time for the displayed data message.

8. The paging receiver in accordance with claim 1 including:

means for determining that no time data field exists in the decoded data message;

a display for displaying the decoded data message to a user; and means for prompting the user to enter into the paging receiver time data corresponding to a future alert time for the displayed data message.

9. The paging receiver in accordance with claim 1 including:

means for storing a default alert signal into the memory means; and means for selecting the default alert signal to be generated by the alarm means when actuated by the actuating means.

10. The paging receiver in accordance with claim 1 further capable of generating a plurality of alert signal types; wherein the data message includes another field containing alert signal data which specifies an alert signal type; and including:

means for reading the alert signal data from the decoded data message and storing it in an assigned portion of the memory means; and means for causing the alert signal type specified by the stored alert signal data of the data message to be generated by the alarm means when actuated by the actuating means.

11. The paging receiver in accordance with claim 1 including means for prompting the user to enter into the paging receiver an alert signal type corresponding to a received data message for use by the alarm means when actuated by the actuating means.

12. The paging receiver in accordance with claim 1 wherein the computing means includes:

means for storing an offset time data into the memory means; and means for adding the stored offset time data to the time data read from the decoded data message to compute the future alert time for the data message.

13. A method of operating a paging receiver to receive a data message of a transmitted call signal including a field containing time data and to generate a future alert signal corresponding to said data message and based on said time data thereof, said method comprising the steps of:

(a) receiving the call signal and decoding the data message therefrom;

(b) reading the time data from the decoded data message;

(c) storing the decoded data message and correspondingly read time data into respectively assigned portions of a memory of said paging receiver;

(d) generating a signal representative of instantaneous time of day;

(e) computing a future alert time corresponding to said decoded data message based on the time data read therefrom; and (f) causing an alert signal to be generated when said time of day signal becomes substantially coincident with said future alert time, whereby a pager user may be reminded of an event, scheduled by time data within a data message received by the user's pager, at a time closely preceding such event.

14. The method in accordance with claim 13 wherein the data message includes a control character to demarcate the time date field thereof; and wherein the step of reading includes the steps of:

locating the control character within the decoded data messages;

locating the time data field within the decoded data message based on the location of the control character; and reading time data from the located time data field for storage into its assigned area of said memory.

15. The method in accordance with claim 14 wherein the step of reading is performed solely by a decoder unit of the paging receiver.

16. The method in accordance with claim 14 wherein the step of reading is performed solely by a microcomputer system of the paging receiver.

17. The method in accordance with claim 13 including steps of:

determining that an improperly formatted time data field exists in the decoded data message;

displaying the decoded data message to a user through a display of the paging receiver; and prompting the user to enter into the paging receiver time data corresponding to a future alert time for the displayed data message.

18. The method in accordance with claim 13 including the steps of:

determining that no time data field exists in the decoded data message;

displaying the decoded data message to a user through a display of the paging receiver; and prompting the user to enter into the paging receiver time data corresponding to a future alert time for the displayed data message.

19. The method in accordance with claim 13 including the steps of:

storing a default alert signal into the memory of the paging receiver; and selecting the default alert signal to be generated in the performance of step (f).

20. The method in accordance with claim 13 wherein the paging receiver is capable of generating a plurality of alert signal types, and the data message includes another field containing alert signal data which specifies an alert signal type; and including the steps of:

reading the alert signal data from the decoded data message and storing it in an assigned portion of memory; and causing the alert signal type specified by the stored alert signal data of the data message to be generated in performing step (f).

21. The method in accordance with claim 13 including the step of prompting the user to enter into the paging receiver an alert signal type corresponding to a received data message for use in performing step (f).

22. The method in accordance with claim 13 wherein the step of computing includes the steps of:

storing an offset time data into the memory of the paging receiver; and adding the stored offset time data to the time data read from the decoded data message to compute the future alert time for the data message.

* * * * *